Jan. 2, 1940.    R. S. NEWTON    2,185,382
APPARATUS FOR MAKING PISTON RINGS
Original Filed Jan. 22, 1934    2 Sheets-Sheet 1
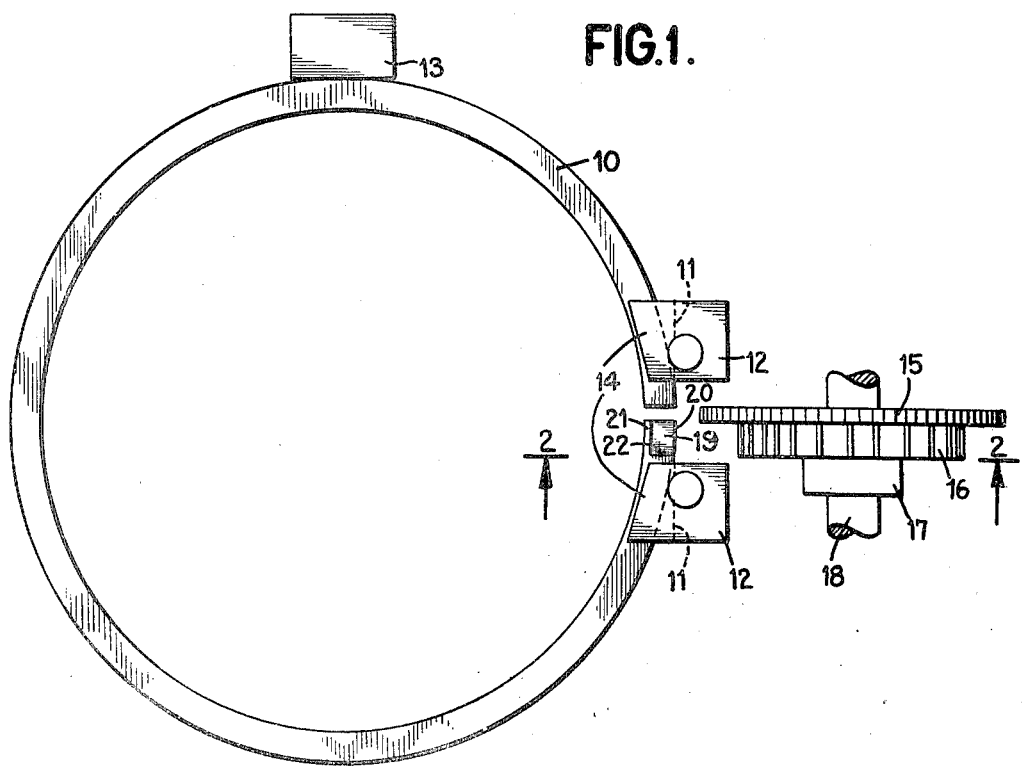
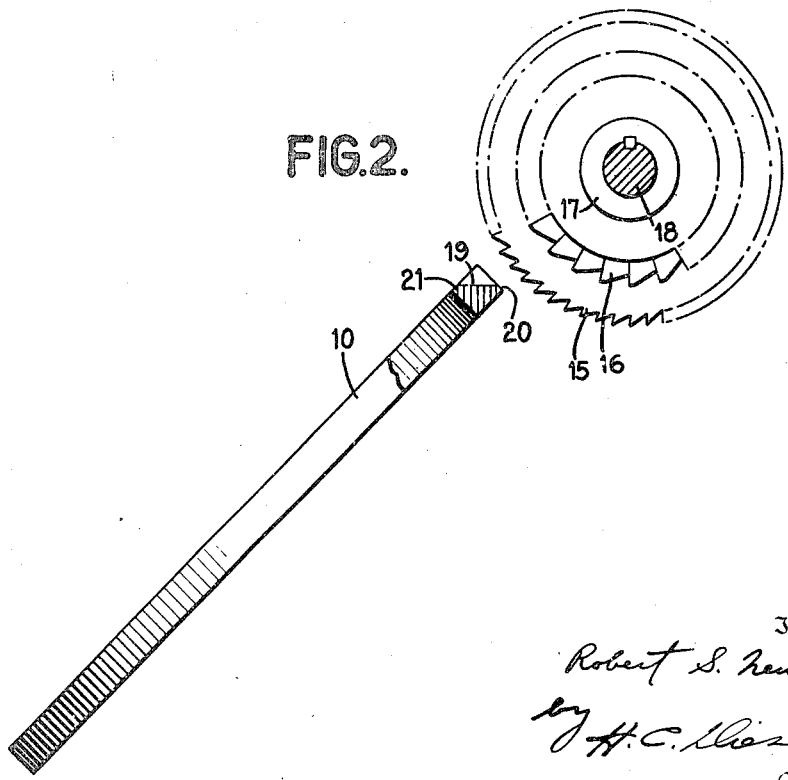
Inventor
Robert S. Newton
by H. C. Liesem
Attorney Patented Jan. 2, 1940

2,185,382

UNITED STATES PATENT OFFICE 2,185,382

APPARATUS FOR MAKING PISTON RINGS

Robert S. Newton, Watertown, N. Y., assignor to The New York Air Brake Company, New York, N. Y., a corporation of New Jersey Original application January 22, 1934, Serial No. 707,675. Divided and this application February 24, 1937, Serial No. 127,358

3 Claims. (Cl. 90—11)

This invention relates to improved apparatus for making piston rings by which extreme accuracy in the diameter of the finished ring and uniformity in the gap and overlap is brought about without the necessity of accurate machining or grinding of the ring surface. This is a division of my pending application, S. N. 707,675, filed January 22, 1934, now Patent No. 2,093,790, issued November 9, 1937.

Heretofore it has been the common practice in the manufacture of piston rings to turn or grind the outer surface of a cylinder, from which the rings were cut, to a given diameter with the accuracy desired in the final product. In the course of splitting the rings a predetermined amount was taken from each. Accurate grinding of the cylinder is expensive to the point of being prohibitive in large scale production. For this reason dependence is usually placed upon a variation in the gap at the overlapped ends to account for difference in the original diameters of rings. This means that only those rings which are of maximum diameter, originally, will have a full overlap when first put into use. Rings which originally have a minimum diameter, within the limits of accuracy permissible in quantity production, will have a considerable gap at the overlapped ends. This, of course, reduces the amount of expansion that can be permitted to offset wear and therefore reduces the average life of the rings.

According to the present invention the diameters of a large number of rings may be made uniform with such accuracy that a substantially fixed, maximum, amount of overlap may be provided for all. This is accomplished, furthermore without increasing the accuracy of the diameter of the cylinders from which the rings are produced. In fact less accuracy than heretofore required may be permitted. Toward the end mentioned the invention contemplates the removal of a variable amount from each ring, when it is split, sufficient to bring its outside diameter to a predetermined measurement with a full overlap.

Other objects and advantages of the invention will appear from the detailed description of an illustrative form of the same which will now be given in conjunction with the accompanying drawings in which:

Figure 1 is a schematic view showing the relation of the ring and cutter following completion of the first operation.

Figure 2 is a side elevation of the parts shown in Figure 1, a portion being in section along the line 2—2 of Figure 1.

Figure 3:
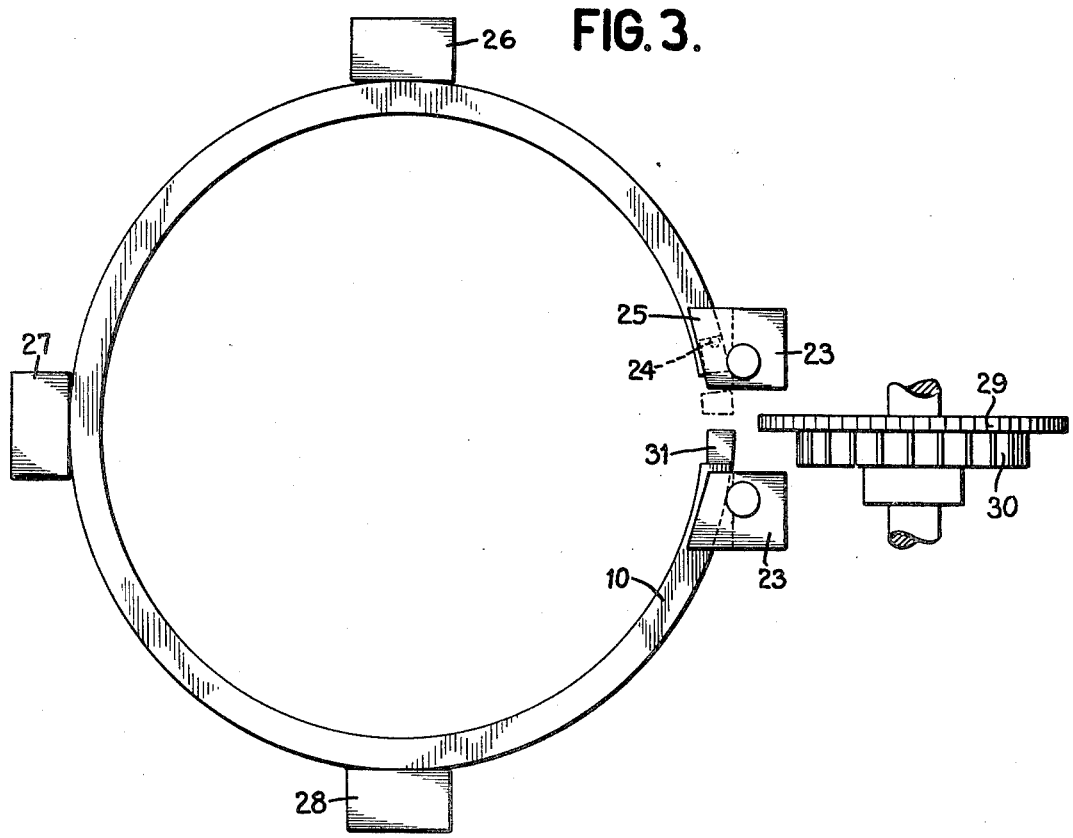
Figure 3 is a view similar to Figure 1 showing the parts after completion of the second operation.
Figure 4:
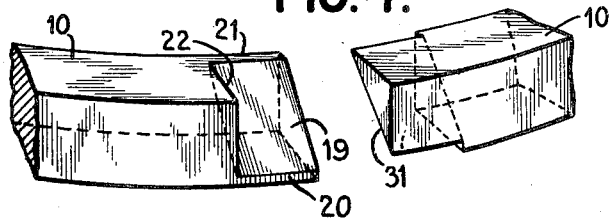
Figure 4 is a perspective view on an enlarged scale showing the overlapping portions of one type of ring made in accordance with the invention.

It will be understood that in the production of rings in accordance with this invention a complete, unbroken annulus is first produced in any convenient way, as by cutting a ring from the end of a cylinder formed of appropriate material. This ring is formed of the desired thickness to fit the grooves of the piston. It is preferably square or otherwise rectangular in cross-section. Now for the first operation, illustrated in Figure 1, the ring 10 is placed upon a suitable table or support with portions engaging shoulders 11 formed by undercut formations in a pair of retaining blocks 12. Another portion at one side of the ring is positioned against a guide or stop 13. The blocks 12 are preferably arranged to be clamped to the table to firmly hold the intermediate portion. Extensions 14 may suitably be engaged over the ring for this purpose.

The ring is now ready for the first cutting operation by means of a two part cutter having a saw portion 15 and a milling portion 16 carried by a hub 17 secured to a shaft 18. With the cutter and ring disposed in the angular relation illustrated in Figures 1 and 2, relative movement is produced between them in a horizontal direction, i. e., parallel with the lower edge of the drawings. This serves to carry the saw portion of the cutter completely through the ring while the milling portion simply forms a substantially flat surface 19 diagonally across the ring from the outer edge 20 to one face 21. The arrangement is preferably such that portions of the surfaces 20 and 21 remain at the ends of the surface 19. This surface extends from a shoulder 22 to the end of the ring. Upon completion of the cutting operation just described the ring and cutter are restored to the relative positions shown in Figures 1 and 2.

The blocks 12 may now be loosened and the ring removed. A second ring may then be applied to the table in the same way and the operation repeated. Any desired number of rings may be subjected to this first operation one after another. If the production at a small plant simply warrants the installation of one machine for performing two operations upon a group of rings the machine may be suitably modified, after the entire group has been subjected to the first operation, to prepare for the second operation. When production permits the installation of two or more machines the second operation may be performed upon a different machine and the same set-up may be maintained continuously on the two machines, so long as rings of a given size and form are being produced.

Referring now to Figure 3 the arrangement for the second operation is clearly illustrated. The ring is placed upon a table inclined at an angle to the horizontal equal to that illustrated in Figure 2, but in the opposite direction, i. e., inclined upwardly away from the cutter. A pair of clamping blocks 23, which may be the same as the blocks 12, is provided to clamp the ends of the ring firmly during the second cutting operation. Beneath one of the clamping blocks the table is provided with a guide pin 24 projecting upwardly toward the portion 25 that extends over the ring. This pin is adapted to engage the shoulder 22, formed in the ring during the first operation, and, in this way, definitely positions the corresponding end of the ring. At three points, spaced 90° apart around the ring, there is preferably provided three guide blocks 26, 27 and 28 for definitely confining the outer contour of the ring. If desired one of these blocks might be omitted and the spacing of the others modified but the number and arrangement shown is considered preferable. Obviously other means might be provided for holding the outer contour of the ring in a definite, predetermined position.

When the ring is properly clamped as shown in Figure 3, relative movement is produced between the table and cutter just as for the first operation. The saw portion 29 of the cutter will remove any excess section of the ring beyond the predetermined circumference desired. At the same time the cutter portion 30 will mill a surface 31 complementary to the surface 19 at the other end of the ring. It will be apparent that in this way rings of uniform circumference, and hence uniform diameter when fully overlapped, will be produced even though considerable variation may exist in the diameters of the cylinders from which the rings are originally cut. The variation in the rings will depend entirely upon the accuracy with which the saw 29 operates in trimming the end of the split ring. This, obviously, can be performed with considerable accuracy without difficulty.

Figure 5:
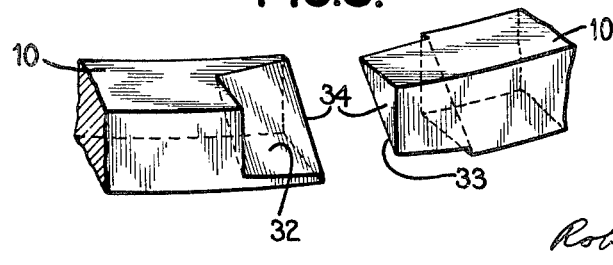
Figure 5 is a similar view of a modified form of ring.

The cooperating ends of the ring may be formed in a variety of ways. For example the surfaces 19 and 31 may be milled strictly flat or they may be milled with a curve having the radius of curvature of the ring. If made flat the cutters 15, 16 and 29, 30 may be made identical. If the surfaces are curved, on the other hand, the cutter 16 must have slightly concave cutting edges while the cutter 30 must have slightly convex cutting edges complemental to those of cutter 16. If desired the surfaces at the ends of the ring may be in a plane inclined at a slight angle toward the end of the ring. This is illustrated in Figure 5 wherein the surface 32 is inclined slightly so that the cross-section through the lapping portion or leg of the ring decreases slightly in area toward the free end. In a similar way the lapping portion 33 has its cooperating face inclined slightly so as to make the two ends complemental when they are fully overlapped. This angular relation of the surfaces can be produced by forming the cutting edges of the cutters 16 and 30 at a small angle to the axes of the cutters or by simply inclining the cutter axes slightly with relation to the horizontal, the teeth of portions 16 and 30 then being made parallel with the axes. The end surfaces 34 at the point of split would, in the latter case, be angled slightly to a true radial plane on account of the tilting of the saw blades but this would not be objectionable.

While the invention has been described in considerable detail in relation to a particular type of ring, it will be understood that the improved apparatus is applicable to the production of other types of rings as well. Various changes may be made in the procedure to suit special circumstances without departing from the general principles and scope of the invention.

What I claim is:

1. Apparatus for producing lap joint piston rings comprising means for severing an oversize ring and forming a leg on one end thereof, means for cutting off a portion of the other end of said ring, and means for positioning said ring relative to said cutting off means to provide a ring of predetermined circumferential length, said last named means including a stop member engaging said formed leg and a plurality of fixed guides disposed around and engaging the body of said ring.

2. Apparatus for producing lap joint piston rings comprising means for severing an over-size ring and forming a leg on one end thereof, means for cutting off a portion of the other end of said ring and for simultaneously forming a complementary leg thereon, and means for positioning said ring relative to said cutting-off means to provide a ring of predetermined circumferential length, said last-named means including a stop member engaging said first formed leg and a plurality of fixed guides disposed around and engaging the body of said ring.

3. Apparatus for producing lap joint piston rings comprising means for severing an over-size ring and forming a leg on one end thereof, means for cutting off a portion of the other end of said ring, and means for positioning said ring relative to said cutting-off means to provide a ring of predetermined circumferential length, said last-named means including a stop member engaging said first formed leg and guide means disposed around and engaging the body of said ring.

ROBERT S. NEWTON.